United States Patent
Agren et al.

(10) Patent No.: US 8,915,141 B2
(45) Date of Patent: Dec. 23, 2014

(54) PRESSURE SENSOR HAVING A CONNECTION HOUSING AND A SENSOR HOUSING

(75) Inventors: Tomas Agren, Uppsala (SE); Klas Marteleur, Uppsala (SE)

(73) Assignee: GE Healthcare Bio-Sciences AB, Uppsala (SE)

( * ) Notice: Subject to any disclaimer, the term of this patent is extended or adjusted under 35 U.S.C. 154(b) by 529 days.

(21) Appl. No.: 13/262,169

(22) PCT Filed: Mar. 29, 2010

(86) PCT No.: PCT/SE2010/050340
§ 371 (c)(1), (2), (4) Date: Sep. 29, 2011

(87) PCT Pub. No.: WO2010/114465
PCT Pub. Date: Oct. 7, 2010

(65) Prior Publication Data
US 2012/0024070 A1   Feb. 2, 2012

(30) Foreign Application Priority Data
Mar. 30, 2009 (SE) ....................... 0900415

(51) Int. Cl.
G01L 7/08 (2006.01)
H01G 7/00 (2006.01)
G01L 19/00 (2006.01)
G01L 19/14 (2006.01)

(52) U.S. Cl.
CPC ........... *G01L 19/0023* (2013.01); *G01L 19/146* (2013.01); *G01L 19/003* (2013.01)
USPC .............................. 73/715; 73/756; 361/283.4

(58) Field of Classification Search
None
See application file for complete search history.

(56) References Cited

U.S. PATENT DOCUMENTS

| | | | |
|---|---|---|---|
| 4,040,297 A | 8/1977 | Karsmakers et al. | |
| 4,939,497 A * | 7/1990 | Nishida et al. | 338/4 |
| 4,984,468 A | 1/1991 | Hafner | |
| 5,191,798 A * | 3/1993 | Tabata et al. | 73/727 |
| 5,255,427 A * | 10/1993 | Hafner | 29/621.1 |
| 5,695,590 A | 12/1997 | Willcox et al. | |
| 6,089,097 A * | 7/2000 | Frick et al. | 73/718 |

(Continued)

FOREIGN PATENT DOCUMENTS

| | | |
|---|---|---|
| DE | 40 08 156 | 9/1991 |
| JP | 1 296130 A | 11/1989 |

(Continued)

OTHER PUBLICATIONS

EP Supplementary Search Report Issued Sep. 12, 2012 on Corresponding EP Application No. 10759120.8.

(Continued)

*Primary Examiner* — Lisa Caputo
*Assistant Examiner* — Jermaine Jenkins

(57) ABSTRACT

Pressure sensor unit for sealed attachment to a fluidic system comprising a mounting member, a membrane cavity extending through the mounting member with an opening in contact with the fluidic system when the sensor unit is attached thereto, a membrane formed at the distal end of the membrane cavity, and a membrane deflection sensor, wherein the membrane is separated from the mounting member by a stress insulating member arranged to isolate the membrane from stress and strain in the mounting member.

9 Claims, 3 Drawing Sheets

(56) References Cited

U.S. PATENT DOCUMENTS

| | | | |
|---|---|---|---|
| 6,601,452 B2 * | 8/2003 | Murata et al. | 73/754 |
| 6,910,383 B2 * | 6/2005 | Ou et al. | 73/754 |
| 7,000,478 B1 * | 2/2006 | Zwollo et al. | 73/708 |
| 7,093,493 B2 * | 8/2006 | Benzel et al. | 73/715 |
| 7,775,119 B1 * | 8/2010 | Suminto et al. | 73/727 |
| 2005/0092093 A1 | 5/2005 | Kang et al. | |

FOREIGN PATENT DOCUMENTS

| | | |
|---|---|---|
| JP | 2001 108553 | 4/2001 |
| JP | 2001-116642 | 4/2001 |
| JP | 2005209548 | 8/2005 |
| JP | 2006038789 | 2/2006 |
| JP | 2006-343115 | 12/2006 |
| WO | WO 00/37912 | 6/2000 |

OTHER PUBLICATIONS

Office Action Dated Dec. 3, 2013 Issued on Corresponding JP Application No. 2012-503367.

* cited by examiner

PRESSURE SENSOR HAVING A CONNECTION HOUSING AND A SENSOR HOUSING

CROSS-REFERENCE TO RELATED APPLICATIONS

This application is a filing under 35 U.S.C. §371 and claims priority to international patent application number PCT/SE2010/050340 filed Mar. 29, 2010, published on Oct. 7, 2010 as WO 2010/114465, which claims priority to application number 0900415-1 filed in Sweden on Mar. 30, 2009.

BACKGROUND OF THE INVENTION

The present invention relates to the art of pressure sensors, and in particular to a pressure sensor unit for sealed attachment to a fluidic system of a biomedical analysis system.

Pressure sensors are key components in many fluidic systems and the like, and they need to meet the requirements of the specific fluidic system and their position therein in order to provide reliable output signals. Pressure sensors are generally limited to a specific pressure range of detection, and there is a vast range of sensors suitable for different purposes. In many applications, one key feature is to avoid the risk of cross contamination between subsequent sample volumes, whereby it is of great importance that it is possible to flush the sensor and that there are no pockets or the like where a fluid may be trapped.

SUMMARY OF THE INVENTION

The object of the invention is to provide a new pressure sensor unit and a pressure sensor arrangement, which sensor unit and sensor arrangement overcomes one or more drawbacks of the prior art. This is achieved by the sensor unit and the sensor arrangement as defined in the independent claims.

One advantage with such a sensor unit is that it is less sensitive to outer influences in the form of sealing force, applied pressure, thermal expansion etc, compared to the prior art.

Another advantage is that the sensor unit body may be integrally formed of one single piece of material, whereby it may be manufactured at low cost and of a homogeneous inert material without deficiencies and contamination pockets.

Embodiments of the invention are defined in the dependent claims.

DETAILED DESCRIPTION OF THE INVENTION

Figure 1A:
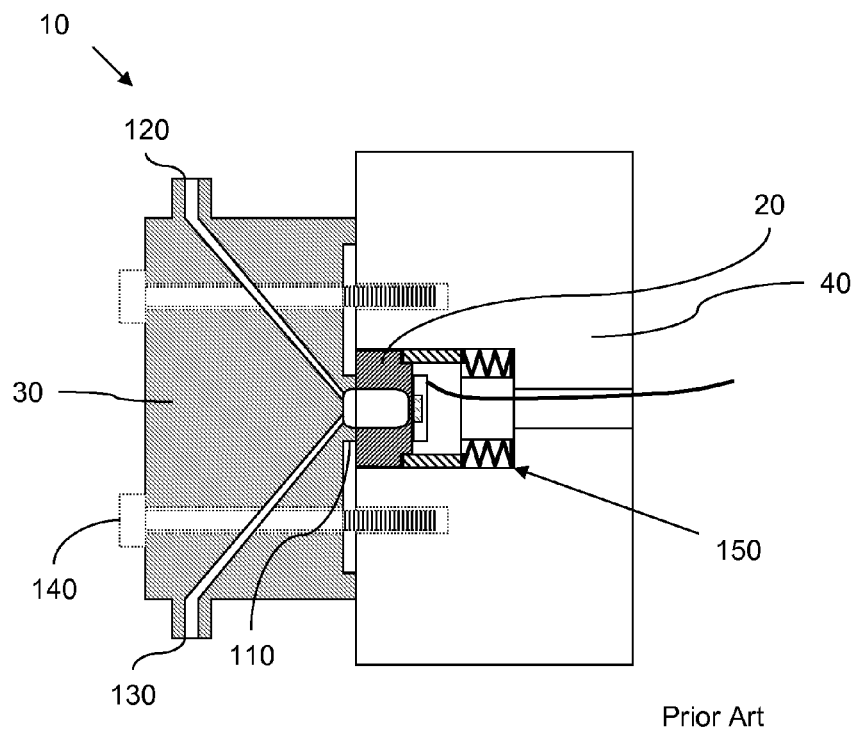
FIGS. 1a to 1c schematically show one example of a pressure sensor assembly.
Figure 1B:
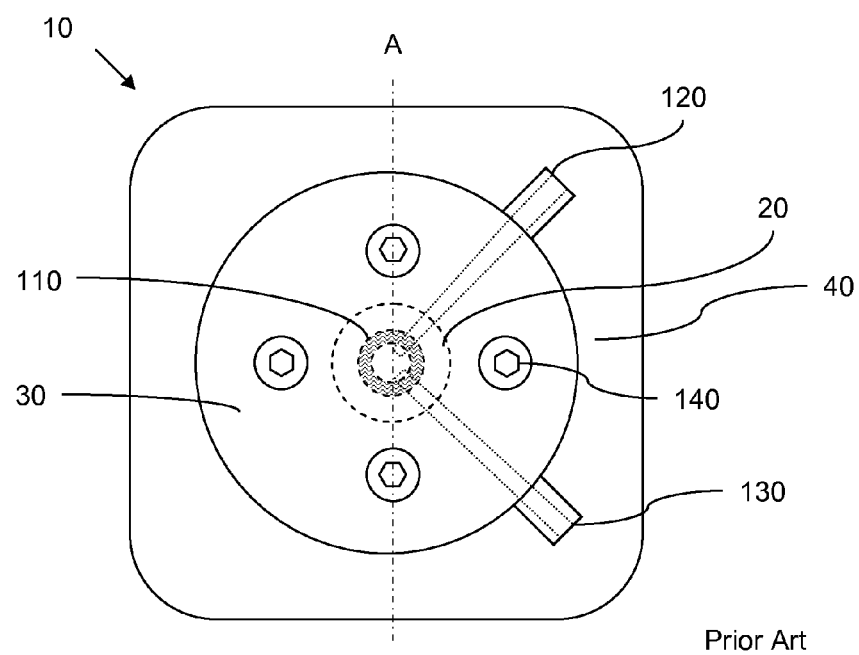
Figure 1C:
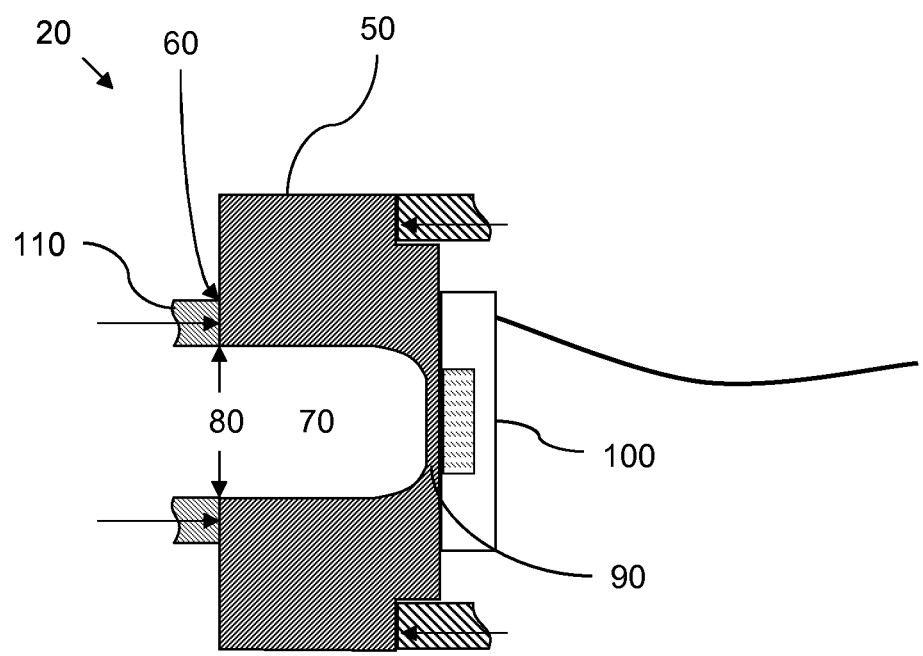

FIGS. 1a to 1c schematically show one example of a pressure sensor assembly 10 with a sensor unit 20, for a high pressure biomedical analysis system or the like. In FIG. 1a, the sensor assembly 10 and the sensor unit 20 are schematically shown in cross section along A-A in FIG. 1b wherein some features have brought into the plane of view for illustrative purposes. FIG. 1b shows a front view with some internal features disclosed by dotted lines, as will be discussed in details below. The pressure sensor assembly 10 comprises a pressure sensor unit 20, a connection housing 30 and a sensor support housing 40.

As is best viewed in FIG. 1c, the pressure sensor unit 20 comprises a mounting member 50 with a sealing surface 60, a membrane cavity 70 extending through the mounting member 50 with an opening 80 being enclosed by the sealing surface 60, a membrane 90 formed at the distal end of the membrane cavity 70, and a membrane deflection sensor 100. The mounting member 50 and the membrane 90 are preferably integrally formed of one single piece of material in order to effectively avoid capillary traps etc, and it is formed to withstand the high pressures of the fluidic system while having a small volume membrane cavity. Alternatively the sensor may be formed by two or more separate parts that are joined together in any suitable way. As is indicated in FIG. 1b, the sensor unit may have a circular cross-sectional shape, but it may be of another shape, such as square, oval or the like. Moreover, the mounting member 50 and the membrane 90 may be of different cross-sectional shapes.

The membrane deflection sensor 100 may be any type of sensor capable of detecting the degree of deflection of the membrane 90, such as a thin-film strain gauge, capacitive gauge, inductive gauge, micro-mechanic sensor, optical sensor etc. In one embodiment, the membrane deflection sensor 100 is a sputtered thin-film full-bridge strain gauge circuit. The sputtered metal strain gauge circuit offers superior long term stability and higher temperature capability than many other strain gauge technologies. In the disclosed sensor assembly, the membrane deflection sensor 100 is connected to a fluidic system control unit or the like by cable 110 that extends through a hole in the back of the support housing. Alternatively, the membrane deflection sensor 100 may be wirelessly connected.

The pressure sensor unit is provided with a sealing surface 60 for sealing against a complementary sealing surface of the pressure sensor assembly (fluidic system) without additional sealing material, in FIGS. 1a to 1c the complementary sealing surface is comprised of an annular sealing ridge 110 on the connection face of the connection housing 20. Such sealing effectively avoids presence of capillary traps, as the seal will extend all the way to the edge interface between the two components to be sealed. In the disclosed embodiment, the sealing surface 60 is formed by a narrow region enclosing the membrane cavity opening 80. The sealing surface 60 is urged against the complementary sealing surface of the annular sealing ridge 110 of the fluidic system by application of a sealing force on the mounting member 50. According to the disclosed embodiment the sealing surface 60 is a flat surface, and in order to achieve a sealed connection it requires extreme surface finish and high pressure at the interface. It should be noted that the sealing surface 60 may be of essentially any shape as long as the complementary sealing surface is of mating shape, e.g. conical, wave shaped or the like.

When the pressure sensor unit 20 is sealed against the annular sealing ridge 110, inlet 120 and outlet 130 formed in the connection housing 30 are placed in fluidic communication with the membrane cavity 70 of the pressure sensor unit 20. The inlet 120 and outlet 130 are used to connect the sensor assembly 10 to a fluidic system. In alternative embodiments, the pressure sensor assembly may be integrated into a functional unit, such as a valve or the like, which may comprise a plurality of inlets and outlets that may be put in fluidic communication with the membrane cavity of the pressure sensor unit 20.

In the disclosed embodiment, the sealing force is provided by arranging the pressure sensor unit 20 in a sensor support housing 40 arranged to support the pressure sensor unit 20 with respect to the connection housing 30, and to be urged against the connection housing 30 by means of one or more fastening members 140. In order to achieve a reproducible sealing force that is not directly dependent on the force applied by the fastening members 140, the support housing 40 comprises a support spring arrangement 150 supporting the pressure sensor unit 20. In FIG. 1a the fastening members 140 are schematically disclosed as bolts that are attached in mating threaded holes in the support housing 40, and the spring arrangement 150 is e.g. comprised of one or more spring washers and a support sleeve.

In order to achieve a sealed connection of the pressure sensor unit 20 to the fluidic system at high pressures, the sealing force need to be very high. However, it has been found that, with respect to the sealing forces involved and the sensitivity of the membrane deflection sensor 100, the sensor unit 20 may respond to external mechanical influence on its housing members 30, 40, which then becomes a potential source of error. By way of example, as is disclosed in more detail in FIG. 1b, the sealing force applied onto the sensor unit 20 by the support sleeve 150 is displaced a distance in the transverse direction from the sealing surface 60. Due to the high sealing force required to achieve the desired sealing between the complementary sealing surfaces 60, the displacement of the sealing force may cause strain and stress in the mounting member 50 which may be transferred to the membrane 90 whereby the sensor characteristics are distorted. When a pressure sensor unit 20 of this type is assembled to its final position in a pressure sensor assembly, the membrane deflection sensor 100 on the membrane 90 may be automatically affected. This mounting strain may be handled by resetting and/or calibrating the registration unit interpreting the output from the membrane deflection sensor 100 after mounting of the sensor assembly 10 and before start of experiments, etc. However, due to the firm mounting of the sensor to the fluidics system, also other outer influences may be transmitted to the membrane, e.g. thermal expansions of different components, mechanical disturbances of the components due to attachment of fluidic tubing and the like. Moreover, pressure changes in the fluidic system may influence the mounting of the sensor unit in the sensor assembly, which may be transmitted to the membrane as a superimposed influence on the membrane deflection.

Figure 2A:
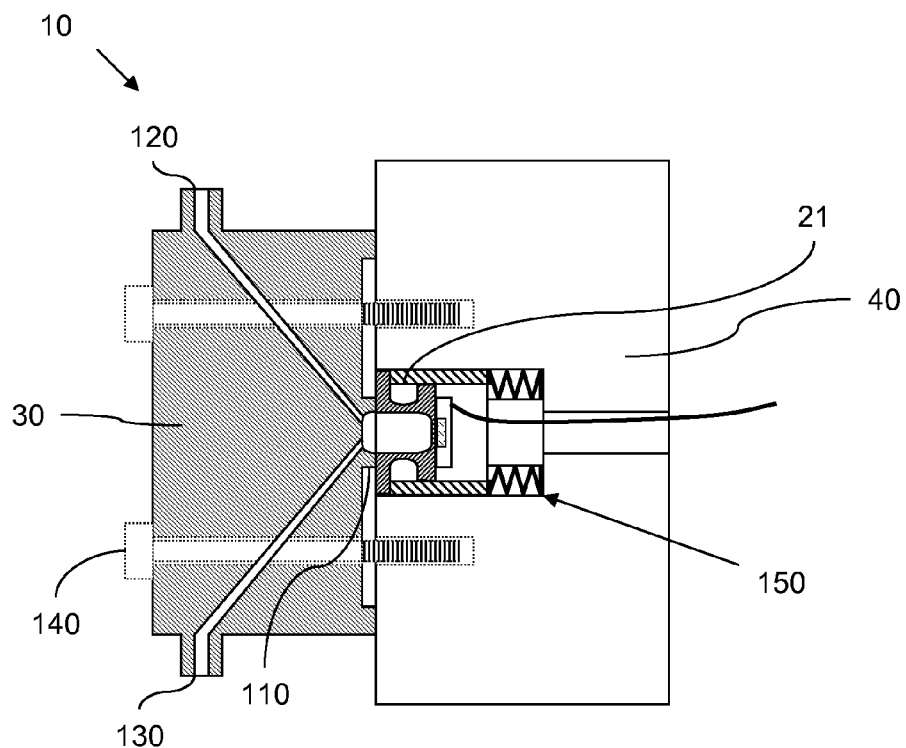
FIGS. 2a and 2b schematically show one embodiment of a pressure sensor assembly, according to the present invention.
Figure 2B:
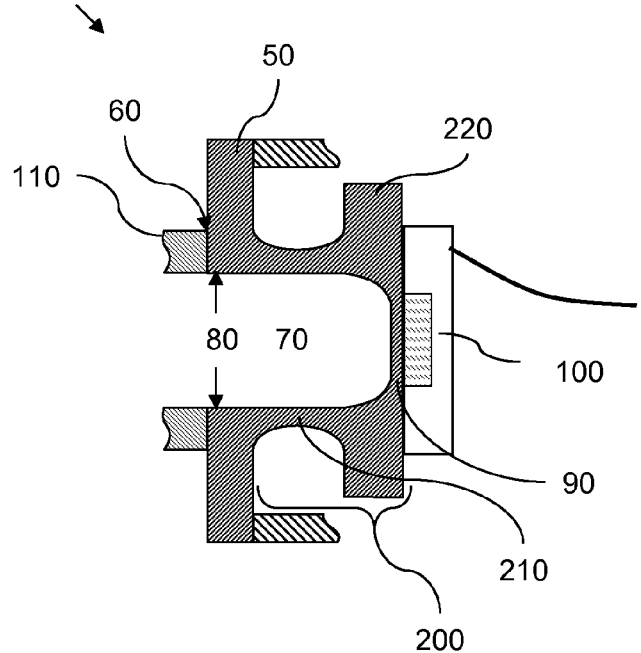

FIGS. 2a and 2b schematically shows one embodiment of a pressure sensor assembly 10 with a sensor unit 21 of the above type, wherein the membrane 90 is separated from the mounting member 50 by a stress insulating member 200 arranged to isolate the membrane 90 from stress and strain in the mounting member 50 due to the mounting to a fluidic system. Like above, in FIG. 2a, the sensor assembly 10 and the sensor unit 21 are schematically shown in cross section along A-A in FIG. 1b.

Like the sensor unit 20 of FIGS. 1a-c above, the sensor unit 21 of FIGS. 2a and 2b comprises a mounting member 50 with a sealing surface 60, a membrane cavity 70 extending through the mounting member 50 with an opening 80 being enclosed by the sealing surface 60, a membrane 90 formed at the distal end of the membrane cavity 70, and a membrane deflection sensor 100, wherein the membrane is separated from the mounting member by a stress insulating member 200 arranged to isolate the membrane 90 from stress and strain in the mounting member 50 due to mounting forces and other external influence.

According to one embodiment, the stress insulating member 200 is a thin walled tubular member 210 interconnecting the attachment member 50 and the membrane 90. The dimensions of the tubular member 210 need to be selected in accordance with the design of the mounting member and the interface to the housings 30 and 40, as well as the mounting forces involved and the desired pressure range for the sensor unit 21. In general terms, the tubular member 210 need to be sufficiently thin walled and long enough to elastically absorb the stress and strain transferred from the mounting member 50 and thus insulate the membrane 90. On the other hand the tubular member 210 needs to be sufficiently rigid to avoid deformation by the pressure of the fluid in the fluid system.

In order to further isolate the membrane 90 from the mounting member 50, the stress insulating member 200, of the disclosed sensor unit 21, comprises a rigid insulation member 220 interconnecting the thin walled tubular member 210 and the membrane 90. In this way the membrane is insulated from any residual stress and strain transferred through the tubular member 210. Like above, the dimensions of the rigid member 220 are governed by the forces and pressures involved as well as the dimensions of the mounting member 50 and the tubular member 210.

The mounting member 50, the stress insulating member 200, and the membrane 90 are preferably integrally formed of one single piece of material in order to effectively avoid capillary traps etc, and it is formed to withstand the high pressures of the fluidic system while having a small volume membrane cavity. Alternatively the sensor may be formed by two or more separate parts that are joined together in any suitable way. As discussed above and indicated in FIG. 1b, the sensor unit 21 may have a circular cross-sectional shape, but it may be of another shape, such as square, oval or the like. Moreover, the mounting member 50, the stress insulating member 200 and the membrane 90 may be of different cross-sectional shapes.

In the disclosed embodiments, the mounting member 50 is of flange type being supported by opposed housing 30, 40 surfaces. However, the mounting member 50 may be supported by the housing 30, 40 in any suitable way providing sufficient support and sealing to the system, such as by external threads, one or more conical support surface or the like. Moreover, the sealed attachment to the fluidic system may be achieved by any suitable sealing system, such flat face seal, conical face seal, radial seal, with or without gasket material.

Upon a theoretical comparison between the sensor unit 20 according to FIG. 1b and a sensor unit 21 according to FIG. 2b using the FEM program ANSYS Workbench, the normal strain caused bye external forces in the membrane 90 was shown to be theoretically about 140 times lower in the FIG. 2b sensor unit 21 vs. the FIG. 1b sensor unit 20.

While preferred illustrative embodiments of the present invention are described, one skilled in the art will appreciate that the present invention can be practised by other than the described embodiments, which are presented for purposes of illustration only and not by way of limitation. The present invention is limited only by the claims that follow.

What is claimed is:

1. A pressure sensor assembly, the assembly comprising a pressure sensor unit for sealed attachment to a fluidic system, the assembly comprising:
a mounting member;
a cavity extending through the mounting member with an opening in contact with the fluidic system when the sensor unit is attached thereto;
a membrane formed at the distal end of the cavity; and
a membrane deflection sensor,
wherein the membrane is separated from the mounting member by a stress insulating member arranged to isolate the membrane from stress and strain in the mounting member;

wherein the pressure sensor assembly further-comprises a connection housing and a sensor support housing;

wherein the connection housing comprises a complementary sealing surface for sealed attachment to the pressure sensor unit, and an inlet and an outlet in fluidic communication with the cavity; and wherein the sensor support housing is arranged to support the pressure sensor unit with respect to the connection housing, and to be urged against the connection housing by means of one or more fastening members.

2. The pressure sensor assembly of claim 1, wherein the stress insulating member is a thin walled tubular member interconnecting the mounting member and the membrane.

3. The pressure sensor assembly of claim 2, wherein the stress insulating member comprises a rigid insulation member interconnecting the thin walled tubular member and the membrane.

4. The pressure sensor assembly of claim 1, wherein the mounting member, the stress insulating member and the membrane are integrally formed of one single piece of material.

5. The pressure sensor assembly of claim 1, wherein the sensor unit has an essentially circular cross section.

6. The pressure sensor assembly of claim 1, wherein the mounting member is of flange type.

7. The pressure sensor assembly of claim 1, wherein the mounting member is provided with external threads.

8. The pressure sensor assembly of claim 1, wherein the mounting member comprises a sealing surface formed by a narrow region enclosing the cavity opening, the sealing surface being arranged to provide sealed attachment to a fluidic system when urged against a complementary sealing surface of the fluidic system by application of a sealing force on the mounting member.

9. The pressure sensor assembly of claim 1, wherein the support housing comprises a support spring arrangement supporting the pressure sensor unit.

* * * * *